July 31, 1956 J. E. LA BELLE 2,756,622
POWER OPERATED TORQUE WRENCH
Filed May 21, 1954

INVENTOR
Jack E. LaBelle
BY
L. D. Burch
ATTORNEY

United States Patent Office 2,756,622
Patented July 31, 1956

2,756,622

POWER OPERATED TORQUE WRENCH

Jack E. La Belle, Detroit, Mich., assignor to General Motors Corporation, Detroit, Mich., a corporation of Delaware Application May 21, 1954, Serial No. 431,387

12 Claims. (Cl. 81—52.4)

The present invention relates to wrenches and more particularly to means for insuring a precision tightening of one threaded member onto another.

In the past when it was desired to tighten a nut onto a bolt to create a predetermined tension in the bolt, the most common practice presently employed is to tighten the nut or bolt until a predetermined amount of torque is required for further tightening thereof.

When the applied torque is accurately measured, this method produces a fairly accurate tension in the bolt at comparatively small loads. However, it has been found that the variations in the threads and friction losses cause variations in the bolt tension. This is particularly true when the tensions in the threaded members approach normal working loads. Accordingly, there may be a considerable amount of variation in the tension finally produced in the threaded members when employing this method.

In addition to the above, there are several other methods of obtaining a desired tension in a bolt, i. e. rotating the members a prescribed amount, tightening the members to produce a prescribed amount of stretch in the bolt, preclamping the parts together with a predetermined load and firmly tightening the nut and bolt before releasing the clamps and various other methods of a similar nature. However, these methods have only been found useful in a limited number of special applications.

It is now proposed to provide a wrench which measures both the amount of torque applied and the amount of relative rotation of the threaded members so as to obtain the advantages of each method. The wrench is adapted to tighten a nut or bolt until a predetermined amount of torque has been applied thereto. This torque is small compared to normal working loads. Under such conditions the tension in the bolt is nearly a direct function of the applied torque and accordingly, any errors that might result from friction losses, etc. will be negligible and the tension produced in the bolt at this point will be a very accurate function of the torque. As the torque is continued to be applied to the nut or bolt and it exceeds the predetermined amount, rotational indicating means will be automatically actuated. These indicating means will register the amount of additional turning of the nut or bolt after the prescribed torque is applied. Since the amount of additional stretch of the bolt and accordingly, the stress therein will be a direct and accurate function of the amount of additional turning, it can be seen that a nut and bolt will be tightened to provide a very accurate tension in a bolt.

In order to facilitate driving one threaded member onto another, it is desirable to employ a suitable power driven wrench. Heretofore, when power means have been employed to apply a desired amount of torque to a threaded member, a clutch has been employed. The clutch is constructed to slip after the prescribed torque has been exceeded. Although this has proved to be very effective, the present clutches have not proved entirely satisfactory and they are subject to numerous objections.

It is now proposed to employ a precision tightening wrench in which the driving unit will be completely deactivated when the bolt is tightened the desired amount. This is to be accomplished by employing a rotary indicating means which will be actuated to rotate with the threaded member. The indicating means may have a stop thereon which will be actuated when the bolt has been turned the desired amount. This makes it possible to very accurately set the amount of turning that will be produced and therefore the tension will be very accurate.

Figure 1:
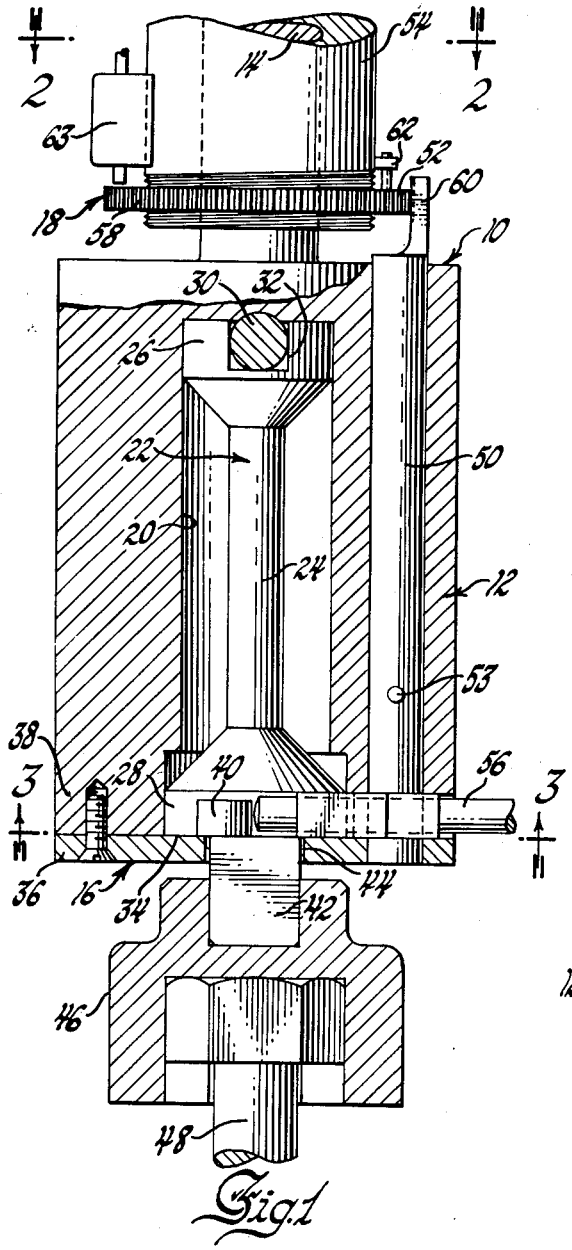
Fig. 1 is a longitudinal cross sectional view of a wrench embodying the present invention.
Figure 2:
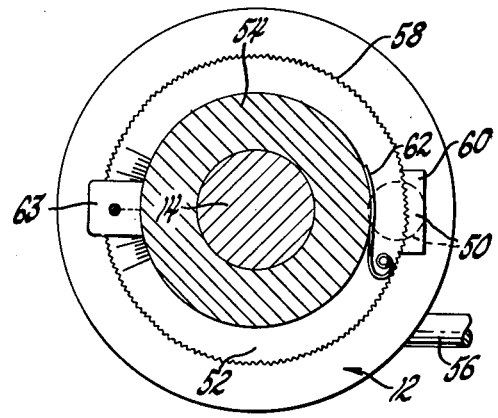
Fig. 2 is a cross sectional view taken substantially along the plane of line 2—2 in Fig. 1.
Figure 3:
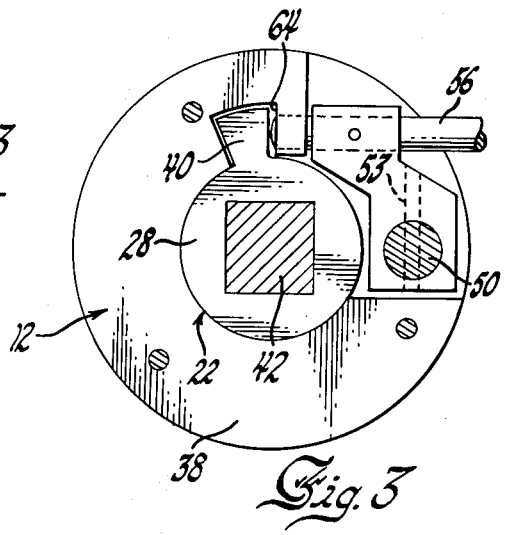
Fig. 3 is a cross sectional view taken substantially along the plane of line 3—3 in Fig. 1.

Referring to the drawing in more detail, the present invention may be embodied in any suitable device such as a wrench 10. This wrench 10 which may be driven by either manual or power means (not shown) includes a substantially cylindrical head 12. In the present instance, the head 12 includes a driveshaft 14 that projects from one end thereof to be coupled to a suitable motor means for rotatably driving the head 12. In order to facilitate proper tensioning of one threaded member on another, the head 12 may have torque responsive means 16 and rotary responsive means 18 mounted thereon.

The present torque means 16 are mounted in a passage 20 in the head 12 so as to rotate therewith. The passage 20 extends axially inwardly from the end of the head 12 opposite the driveshaft 14 and it receives one end of a torsion bar 22. The center portion 24 of the torsion bar 22 may be of a reduced diameter so as to increase its sensitivity while the opposite ends 26 and 28 thereof are enlarged enough to just fit inside of the passage 20. The inner end 26 of the torsion bar 22 may be coupled to the inner end of the passage 20 by any suitable means such as a pin 30 that fits into a slot 32. The other end of the bar 22 may have a shoulder 34 that seats on an end plate 36 secured to the open end 38 of the head 12. A lug 40 may be provided on the shoulder 34 that projects radially therefrom for sliding movement around the end plate 36 during twisting of the torsion bar 22. A conventional adaptor 42 may be provided on the enlarged end 28 of the torsion bar 22 to project through an opening 44 in the end plate 36 and receive a conventional socket wrench 46. This socket wrench 46 may be adapted to fit onto a threaded member 48 such as a nut or bolt.

It can be seen that when a torque is applied to the driveshaft 14, the torque will be transmitted from the head 12 to the torsion bar 22. The torsion bar 22 and the socket wrench 46 on the end thereof will in turn rotate the nut or bolt 48 and cause it to be threaded into position. It is thus apparent that the torque applied to the torsion bar 22 will be substantially equal that applied to the nut or the bolt 48.

The rotary indicating means 18 includes a dial plate 52 and a lever 50 that is pivotally mounted on a pin 53 secured to the head 12. The dial plate 52 is preferably rotatably mounted on a stationary member such as the threaded end of a tube which forms a stationary column 54 disposed concentrically about the driveshaft 14. The lower end of the lever 50 is provided with a push rod 56 that is positioned to engage the lug 40 projecting from the enlarged end 28 of the torsion bar 22. If the push rod 56 is adjustably mounted on the lever 50, it may be moved and vary the amount of torque required to cause the lug 40 to strike the push rod 56. The upper end of the lever 50 may be positioned to engage the periphery of the dial plate 52. In the present instance both the periphery 58 of the dial 52 and the upper end 60 of the lever 50 are serrated to facilitate a more positive engagement between the two members. If the dial plate 52 is threaded on the lower end of the stationary column 54, any rotary movement of the dial plate 52 will cause it to move axially along the column 54. Any suitable spring means 62 may be provided for biasing the dial 52 toward its zero position to insure its returning to said position when it is not engaged by the lever 50.

Suitable indicating means may be provided for registering the amount of rotation of the dial plate 52. If the wrench 10 is to be manually driven, the indicating means may have suitable indicia circumferentially spaced thereon for indicating the amount of rotation. Also an alarm may be actuated by movement of the plate 52 to produce an audible or visible signal for notifying the operator when the dial plate 52 has rotated the prescribed amount. However, when the wrench 10 is to be driven by a motor, it has been found desirable to employ some form of switch means 63 that will be actuated by the movement of the dial plate 52. This switch means 63 will cause the driving force on the driveshaft 14 to cease when the switch is engaged by the dial plate 52 after the desired amount of rotation of the nut or bolt as registered on the dial plate 52.

It should be noted that during operation of the wrench 10, the torque applied to the bolt will be transmitted directly through the torsion bar 22. This in turn will cause the opposite ends of the torsion bar 22 to be twisted in opposite directions. Due to the reduced diameter of the center portion 24, the torsion bar 22 will be very sensitive to the torque and this displacement will occur even though the torque on the bolt is comparatively small. However, when this torque reaches the prescribed amount, the deflection of the torsion bar 22 will result in the lug 40 engaging the push rod 56 and moving the lever 50 to actuate the rotary indicating means 18.

It should be noted that the amount of torque required for this actuation may be varied by proper positioning of the push rod 56. Although the position of the push rod in the present wrench is fixed during assembly of the wrench, if desired, the position of rod 56 may be adjustably mounted on the lever 50 by any suitable means such as a threaded connection. The torque should be small enough to prevent the effects of variations in the threads and friction losses becoming large enough to destroy the direct proportion between the torque and the tension. When the torque applied by the wrench 10 to the bolt 48 is further increased, the lug 40 will move the push rod 56 and cause the lever 50 to pivot until the upper end 60 thereof engages the periphery 58 of the dial plate 52.

It has been found advantageous to reduce the diameter of the center portion 24 of the torsion bar 22 so as to increase its sensitivity. When this is done the torsion bar 22 will not be strong enough to withstand the full tightening torque. Accordingly, a face 64 may be formed in the open end 38 of the head 12. Thus when enough torque has been applied to the torsion bar 22 to cause the lug 40 to move the push rod 56 and cause the lever 50 to engage the dial plate 52, the lug 40 will abut against the face 64. This will thus limit the amount of deflection of the torsion bar 22 and will cause the head to directly apply the majority of the heavy torque to the threaded member 48. However, all of the torque will be applied directly through the torsion bar 22 until the predetermined amount is exceeded.

After the upper end 60 of the lever 50 engages the dial plate 52 further rotation of the head 12 and bolt 48 will cause the dial plate 52 to rotate about the column 54. The operator may then observe the amount of rotation indicated on the dial plate 52 or if switch or stop means 63 are provided, he may allow the wrench 10 to continue operation until the stop means 63 deactivates the drive means after the bolt 48 has been rotated the prescribed amount.

When the torque on the torsion bar 22 is released, the lug 40 will disengage the push rod 56 and cause the lever 50 to disengage the dial plate 52. As soon as the dial plate 52 is free, the spring 62 will return the dial plate 52 to the zero position, thus making the wrench 10 ready for the next operation.

It can thus be seen that a wrench has been provided that can be employed for insuring very accurate tensioning of a bolt by employing a combination of a torque measuring means and a rotary measuring means.

It is to be understood that, although the invention has been described with specific reference to a particular embodiment thereof, it is not to be so limited since changes and alterations therein may be made which are within the full intended scope of this invention as defined by the appended claims.

What is claimed is:

1. In a device of the class described, the combination of a drive adapted to be connected to a first threaded member for threading said first member onto a second threaded member to produce a predetermined tension in said second member, torque means operatively associated with said drive and being responsive to the torque applied to said first member, and rotary indicating means actuated by said torque means whenever a predetermined amount of torque is applied to said member, said rotary indicating means being positioned to indicate the amount of additional rotation of said first member after said first member is subjected to said predetermined torque.

2. Means for tightening one threaded member onto another threaded member, said means comprising the combination of a device for drivingly engaging and rotating one of said members, torsion means connected to said device and being responsive to the torque applied to said member, indicating means actuated by said torsion means when the torque applied to said member exceeds a predetermined amount, said indicating means being responsive to the amount of rotation of said member after said torque exceeds said predetermined amount.

3. In a wrench for tightening one threaded member onto another threaded member, means for insuring a predetermined amount of tension in said members, said means comprising a drive head adapted to be rotatably driven, torque means carried by said head to be drivingly connected to one of said threaded members, and rotation indicating means actuated by said torque means when the torque applied to said last mentioned threaded member exceeds a predetermined amount, said rotation indicating means being adapted to indicate the amount of rotation of said head after said torque has exceeded said predetermined amount.

4. In a wrench for tightening one threaded member onto another threaded member, means for insuring a predetermined amount of tension in said members, said means comprising a head adapted to be rotatably driven, torque means carried by said head to be drivingly connected to one of said threaded members, an indicating dial positioned adjacent said head, a movable member mounted on said head and operatively associated with said dial, said movable member being actuated by said torque means when the torque applied to said last mentioned threaded member exceeds a predetermined amount, said member being effective for causing said dial to register the amount of rotation of said head after said predetermined amount of torque has been applied to said members.

5. In a wrench for tightening one threaded member onto another threaded member, means for insuring a predetermined amount of tension in said members, said means comprising a head having a driveshaft projecting therefrom for rotatably driving said head, a normally stationary sleeve disposed concentrically about said driveshaft, torque means carried by said head to be drivingly connected to one of said threaded members, a normally stationary dial plate movably disposed on said sleeve adjacent said head, a member carried by said head and actuated by said torque means when the torque applied to said last mentioned threaded member exceeds a predetermined amount, said member then causing said plate to move with said head and indicate the amount of additional rotation of said last mentioned threaded member after said predetermined torque is applied thereto.

6. In a wrench for tightening one threaded member onto another threaded member, means for insuring a predetermined amount of tension in said members, said means comprising a head having a driveshaft projecting therefrom, drive means operatively connected to said driveshaft for rotatably driving said head, a normally stationary sleeve disposed concentrically about said driveshaft, torque means carried by said head to be drivingly connected to one of said threaded members, a normally stationary dial plate movably disposed on said sleeve adjacent said head, a member carried by said head and actuated by said torque means when the torque applied to said last mentioned threaded member exceeds a predetermined amount, said member then causing said plate to move with said head for indicating the amount of additional rotation of said last mentioned threaded member after said predetermined torque has been applied thereto, and stop means actuated by movement of said plate for stopping said drive means after a predetermined amount of rotation thereof.

7. In a wrench for tightening one threaded member onto another threaded member, means for insuring a predetermined amount of tension in said members, said means comprising a substantially cylindrical head having a passage extending axially inwardly from one end thereof, a torsion member disposed in said passage with the inner end thereof being drivingly connected to said head, the other end of said member projecting from said head and being adapted to be connected to one of said threaded members, and rotary indicating means actuated by said torsion member when the torsion in said member exceeds a predetermined amount, said rotary indicating means being adapted to indicate the amount of rotation of said head after said predetermined torque is applied thereto.

8. In a wrench for tightening one threaded member onto another threaded member, means for insuring a predetermined amount of tension in said members, said means comprising a substantially cylindrical head having a passage extending axially inwardly from one end thereof, a torsion member disposed in said passage with the inner end thereof being drivingly connected to said head, the other end of said member projecting from said head and being adapted to be connected to one of said threaded members, an indicating dial positioned adjacent said head, a movable member mounted on said head and actuated by said torsion member when the torsion applied to said last mentioned member exceeds a predetermined amount, said member being effective for causing said dial to indicate the amount of additional rotation of said head after said predetermined torque has been applied.

9. In a wrench for tightening one threaded member onto another threaded member, means for insuring a predetermined amount of tension in said members, said means comprising a substantially cylindrical head having a driveshaft projecting from one end thereof, a passage extending axially inwardly into said head from the other end thereof, a stationary sleeve disposed concentrically about said driveshaft and terminating adjacent said head, a torsion bar disposed in said passage with the inner end thereof being drivingly connected to said head, the other end of said bar projecting from said head and being adapted to be connected to one of said threaded members, a normally stationary dial plate movably mounted on said sleeve adjacent said head, a lever member pivotally carried by said head, said lever member being actuated by twisting of said torsion bar for causing said plate to rotate with said head, and means for causing said plate to register the amount of rotation of said head after said predetermined torque has been applied.

10. In a wrench for tightening one threaded member onto another threaded member, means for insuring a predetermined amount of tension in said members, said means comprising a substantially cylindrical head having a driveshaft projecting from one end thereof, drive means coupled to said driveshaft for rotatably driving said head, a passage extending axially inwardly from the other end of said head, a stationary sleeve disposed concentrically about said driveshaft and terminating adjacent said head, a torsion bar disposed in said passage with the inner end thereof being drivingly connected to said head, the other end of said bar projecting from said head and being adapted to be connected to one of said threaded members, a normally stationary dial plate movably mounted on said sleeve adjacent said head, a lever pivotally carried on said head, said lever being actuated by twisting of said torsion bar to engage said plate when a predetermined amount of torque is applied to said last mentioned threaded member, said lever being effective to cause said plate to rotate with said head to register the amount of rotation of said head, and stop means actuated by excessive movement of said plate to stop said drive means.

11. The method of threading a first threaded member onto a second threaded member comprising rotating one of said members relative to the other until a predetermined torque is required for further relative rotation of said members and then continuing to rotate said members relative to each other through some predetermined amount of angular displacement.

12. The method of tightening a nut member onto a bolt member comprising first rotating said members relative to each other until at least a predetermined amount of torque is required for further tightening of said nut and bolt members and then continuing to rotate said members relative to each other in the same direction through some predetermined amount of angular displacement.

References Cited in the file of this patent

UNITED STATES PATENTS

| | | |
|---|---|---|
| 1,985,916 | Coates et al. | Jan. 1, 1935 |
| 2,394,386 | Husband | Feb. 5, 1946 |
| 2,410,695 | Werner | Nov. 5, 1946 |
| 2,422,905 | Jackson | June 24, 1947 |
| 2,616,323 | Leifer | Nov. 4, 1952 |
| 2,639,637 | Stirzel | May 26, 1953 |
| 2,685,808 | Garvin | Aug. 10, 1954 |